United States Patent [19]
Hori

[11] Patent Number: 5,833,149
[45] Date of Patent: Nov. 10, 1998

[54] METHOD FOR THE GRANULATION OF POLYTETRAFLUOROETHYLENE POWDER

[75] Inventor: Yoshihiro Hori, Shimizu, Japan

[73] Assignee: Du Pont Mitsui Fluorochemicals, Tokyo, Japan

[21] Appl. No.: 808,516

[22] Filed: Feb. 27, 1997

[51] Int. Cl.$^6$ ................................................ B02C 19/12
[52] U.S. Cl. .................................. 241/16; 241/21; 241/22
[58] Field of Search ................................. 241/16, 21, 22, 241/27, 15

[56] References Cited

U.S. PATENT DOCUMENTS 3,265,679 8/1966 Black, III et al. ..................... 260/92.1
3,726,483 4/1973 Kometani et al. ......................... 241/5
3,992,350 11/1976 Bensa et al. ........................... 241/22 X

FOREIGN PATENT DOCUMENTS 1100388  1/1968  United Kingdom .

*Primary Examiner*—John M. Husar

[57] ABSTRACT

A method for the granulation of polytetrafluoroethylene powder comprises spraying a binder solution on the powder while the powder is stirred and ground. The binder solution is an aqueous surfactant solution having a surface tension of 25 dyne/cm or lower at 20° C. and contains polytetrafluoroethylene colloidal particles.

3 Claims, 1 Drawing Sheet

– 1 –
METHOD FOR THE GRANULATION OF POLYTETRAFLUOROETHYLENE POWDER

FIELD OF THE INVENTION

This invention is related to a method for the granulation of polytetrafluoroethylene powder through a solid-liquid mixing granulation process.

BACKGROUND OF THE INVENTION

Since polytetrafluoroethylene (abbreviated below as PTFE) has a very high melt viscosity, molded products have to be made with a special method, including pre-press-molding and sintering. Granulated PTFE powder is often used in this method. Therefore, the properties of the granulated PTFE can significantly affect the moldability of the material as well as the properties of the molded product, and, the powder should at least satisfy a number of requirements. For example, the granulated PTFE powder should have a good granule fluidity, so that the template can be filled easily and completely in the molding process. Moreover, since the size of the template used in the press molding is limited, the powder should have a high apparent density. In addition, in order to obtain a fine and dense pre-molded product under the pressure used in the press molding, the particle size of the primary PTFE powder particles should be as small as possible.

It has been proposed that the PTFE obtained froth the current suspension polymerization must be ground to form a PTFE powder and then granulated to form the secondary particles (granules) to satisfy the above requirements. In the granulation process, the ground PTFE powder is added to a mixture containing water and organic solvent insoluble or slightly soluble in water, and then the resulting mixture is stirred at a temperature of 0°–100° C. to obtain the granulated PTFE powder (Japanese patent Kokoku Sho 44-22619). Moreover, the granulation can also be carried out by spraying an organic solvent on the ground PTFE powder, while the powder is stirred and ground (Japanese patent Kokoku Sho 43-6290). Usually, the organic solvent used in the solid-liquid mixing granulation of PTFE powder has a surface tension of 45 dyne/cm or lower. It can be, for example, methanol (22.6 dyne/cm), ethanol (22.3 dyne/cm), isopropanol (21.7 dyne/cm), n-hexane (18.4 dyne/cm), m-xylene (28.9 dyne/cm), carbon tetrachloride (26.8 dyne/cm), trichloroethylene (29.0 clyne/cm), perchloroethylene (30.0 dyne/cm), acetone (23.7 dyne/cm), methyl ethyl ketone (24.6 dyne/cm).

However, the first method described uses trichloroethylene, tetrachloroethylene, 1,1,1-trichloroethane, trichlorotrifiluoroethane, etc., as the organic solvent insoluble in water, and these solvents are known now to cause environmental pollution. Therefore, this method should not be used from now on. Besides, the method also has a problem that when the PTFE powder is used together with filler powder in the granulation process, the filler powder will be separated from the powder mixture.

On the other hand, in the second method, since various kinds of organic solvents can be used in the spraying process, the environmental pollution caused by halogenated organic solvents can be completely avoided. However, the apparent density and the powder fluidity of the granulated PTFE powder prepared by this method are relatively low as compared to those of the powder prepared by the first method.

SUMMARY OF THE INVENTION

This invention provides an improved method for the granulation of polytetrafluoroethylene powder through a solid-liquid mixing granulation process. The method comprises spraying a binder solution on said powder while said powder is stirred and ground, said binder solution being an aqueous surfactant solution having a surface tension of 25 dyne/cm or lower at 20° C. and containing polytetrafluoroethylene colloidal particles, thereby obtaining granulated polytetrafluoroethylene powder.

By using the method of this invention, granulated polytetrafluoroethylene powder with an apparent density higher than or equal to that of currently available granulated polytetrafluoroethylene powder can be prepared without causing environmental pollution and safety problem in the work place and without filler separation from the polytetrafluoroethylene powder in the mixing granulation process.

DETAILED DESCRIPTION

Figure 1:
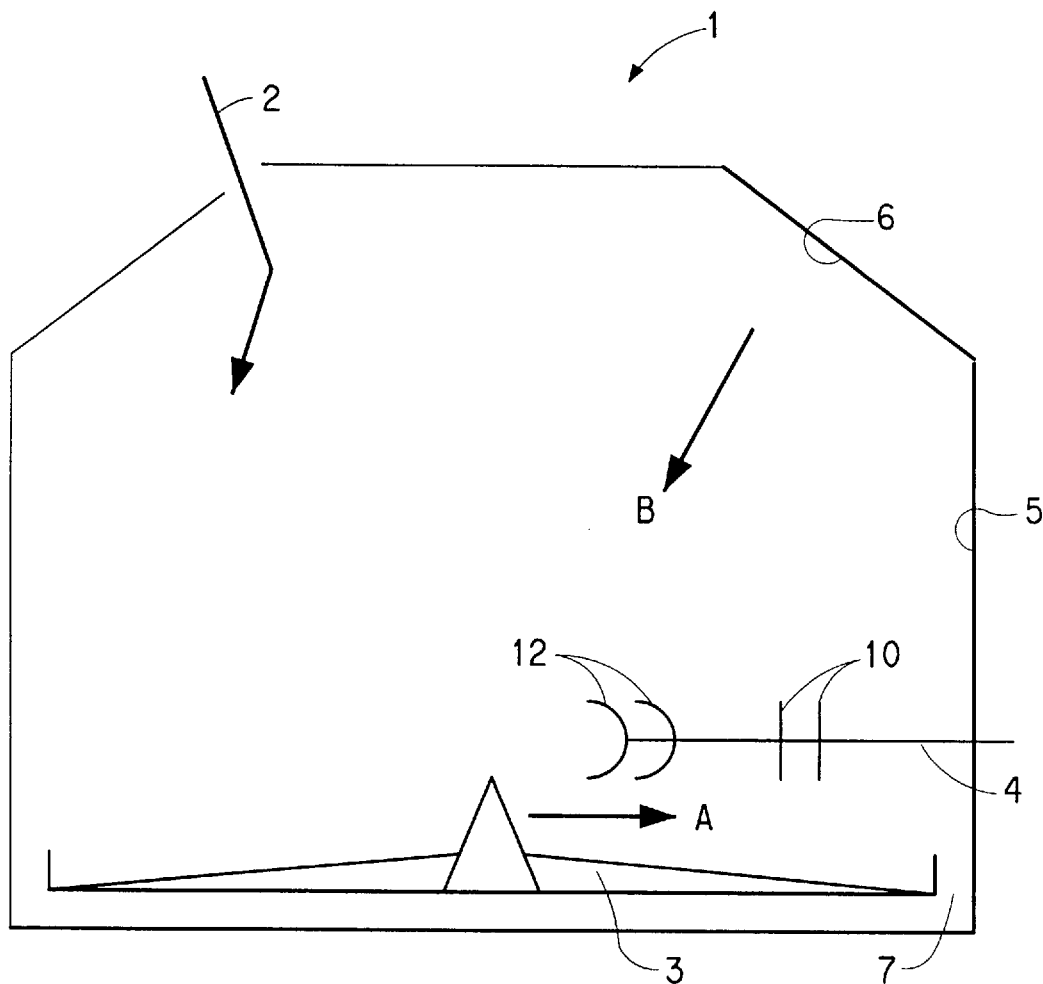
FIG. 1 shows a schematic cross-sectional drawing of the commercial equipment used in the examples.

This invention concerns an improved method based on the second method described above. The method of this invention can be used to prepare granulated PTFE powder with an apparent density higher than or equal to that of the current granulated PTFE powder without causing environmental pollution and safety problem in the working place or the filler separation from the PTFE powder in the mixing granulation process.

In other words, this invention provides a method for the granulation of polytetrafluoroethylene powder, which can be used to prepare granulated polytetrafluoroethylene powder by spraying a binder solution on the powder while the powder is stirred and ground and is characterized by that the binder solution used is an aqueous surfactant solution having a surface tension of 25 dyne/cm or lower at 20° C. and containing polytetrafluoroethylene colloidal particles.

The PTFE powder used in this invention, i.e., the starting material for the granulation process (the primary particles), can be a homopolymer of tetrafluoroethylene (TFE) or a copolymer consisting of TFE and 1.0 wt % or less of other copolymerizable monomers, such as hexafluoropropylene, perfluoro(alkyl vinyl ether), etc., prepared through suspension polymerization. The PTFE resin produced by suspension polymerization is usually subjected to grinding to reduce the particle size. The average particle size of the PTFE powder after grinding should be in the range of 5–100 $\mu$m, preferably 10–50 $\mu$m ($\mu$m=micrometer).

The polytetrafluoroethylene powder may also be blended with various fillers before granulation by the method of this invention, so that the filler becomes incorporated in the granules during the granulation process. There is no special limitation on the filler, and any filler commonly used with PTFE powder is suitable for this purpose. It can be, for example, powders as well as fibers of glass, carbon, graphite, mica, bronze, molybdenum disulfide, alumina, zirconium oxide, silicon carbide, and the like.

The method of this invention is characterized by using both liquid binder and solid binder. As a liquid binder, an aqueous surfactant solution with a surface tension of 25 dyne/cm or lower at 20° C. can be used. Since the liquid binder contains mainly water, the environmental pollution caused by halogenated organic solvents as well as the safety problem in the work place due to hydrocarbon solvents can be completely prevented. Moreover, by using a liquid binder with a surface tension of 25 dyne/cm or lower, a good wetting effect of the aqueous solution on the PTFE powder can be obtained.

By adding a fluorocarbon anionic surfactant, the surface tension of the aqueous binder solution can be reduced to 25 dyne/cm or lower, which is the same as or even lower than that of the organic solvents listed above.

There is no special limitation on the type of the fluorocarbon anionic surfactant used in the method of this invention, as long as it is soluble in water at 20° C. and can reduce the surface tension of the aqueous binder solution to 25 dyne/cm or lower. The fluorocarbon anionic surfactant has a hydrophobic group such as a straight-chain perfluoroalkyl group or a branched perfluoroalkenyl group. The surfactant also has a hydrophilic group which, for example, can be either a sulfonic acid group or a carboxylic acid group or salt thereof The fluorocarbon anionic surfactants $C_9F_{17}$—O—Ph—O—$SO_3Na$, $C_7F_{15}COONH_4$, and $C_8F_{17}SO_3Na$, for example, are very suitable for this purpose.

Moreover, a suitable amount of the fluorocarbon anionic surfactant should be added to the aqueous binder solution to achieve a surface tension of the solution in the range of 25 dyne/cm or lower. Normally, the amount added is in the range of 0.1–5.0 wt % with respect to (based on the weight of) the PTFE powder. Using excess surfactant will not cause problem but will increase the cost.

In the method of this invention, PTFE colloidal particles are used as the solid binder. The colloidal particles can be prepared through the emulsion polymerization of tetrafluoroethylene and are usually dispersed in water with an average particle size in the range of 0.1–0.3 $\mu$m (100–300 nm). Moreover, there is no special limitation on the content of the solid binder, and usually it is in the range of 5–50 wt % with respect to the total amount of binder used and 5–25 wt % with respect to the amount of PTFE powder (or the total amount of the powder mixture of PTFE powder and filler). Thus, the granulated PTFE powder contains two types of PTFE, the granular type produced by suspension polymerization and the dispersion type produced by aqueous dispersion polymerization. Since the granular type is present-in a greater amount than the dispersion type, the granules of PTFE powder can be considered to be granules of PTFE powder of the granular type, which granules contain colloidal particles of PTFE of the dispersion type.

The fluorocarbon anionic surfactant is very effective in reducing the surface tension of water. However, it is expensive and the amount used has to be limited. In some cases, using less amounts of the fluorocarbon anionic surfactant may result in unstable dispersion of the PTFE colloidal particles. Therefore, a hydrocarbon surfactant can be added to further stabilize the dispersion of the PTFE colloidal particles. The hydrocarbon surfactant used for this purpose can be either an anionic surfactant or a nonionic surfactant. In the method of this invention, by using the following hydrocarbon anionic surfactants, a high dispersion of the PTFE colloidal particles can be obtained. Such surfactants include, for example, Na, K, Li and $NH_4$ salts of polyoxyethylenealkylphenyl ether ethylenesulfonic acid (polyoxyethylene n=1–6, alkyl group carbon atom number of 8–11), alkylbenzenesulfonic acid (alkyl group carbon atom number of 10–12), dialkyl sulfosuccinate (alkyl group carbon atom number of 8–10), and the like.

The amount of the hydrocarbon anionic surfactant added should be in the range of 1–10 wt %, preferably 1.5–5 wt %, with respect to the weight of PTFE colloidal particles. If the amount of the hydrocarbon anionic surfactant added is less than 1 wt %, the effect of stabilizing the PTFE colloidal particles will be insufficient. On the other hand, however, using excess hydrocarbon anionic surfactant will increase the cost.

In the method of this invention, the amount of the binder sprayed on the PTFE powder (or the powder mixture of PTFE powder and filler) should be in the range of 30–200 wt %, based on the weight of powder or powder mixture. If the amount of the binder sprayed is less than 30 wt %, the wetting on the PTFE powder will be insufficient, resulting in a poor granulation. On the other hand, however, if the amount of the binder sprayed is more than 200 wt %, the granulated PTFE powder particles may aggregate and the particle size will become too big.

Adding the solid binder or the PTFE colloidal particles has the effect of increasing the bulk density of the granulated PTFE powder and preventing the separation of the filler from the powder particles. However, using excess solid binder may decrease the granule fluidity of the granulated powder.

In the method of this invention, the granulation is carried out by spraying the binders described above on the PTFE powder particles with an average particle size of 5–50 $\mu$m, while the powder is stirred and mixed. The spraying of binder solution is followed by a period of stirring and grinding. There is no special limitation on the granulation equipment used for this purpose, as long as the equipment can apply the stirring and grinding forces on the PTFE powder.

In the following, the method of this invention is explained with reference to the granulation equipment shown in FIG. 1. With agitator 3 rotating, the binders are sprayed (as shown by the arrow) through spray 2 on the PTFE powder previously present in shell 1, and the PTFE powder particles are wetted and form blocks. Through agitator 3, centrifugal force and rotating force are applied on the wetted PTFE powder particles, so that the particles rotate and deflect in their motion in the direction shown by arrow A in the agitator. Thus, the effect of agitator 3 is to stir and mix the powder. The agitator rotates with a circumferential speed of about 6.25 m/sec. The moving PTFE powder blocks are crashed by chopper 4, which is mounted on cylinder-shape wall 5 of shell 1 and rotates at a high speed, to give the granulated PTFE powder with an average granule size of 100–1000 $\mu$m. Chopper 4 is equipped with several wings, including cutting wings 10 crashing (i.e., reducing the size of) the PTFE powder blocks as well as granulating wings 12 sending the PTFE powder particles to the center of the shell where they are again deflected by agitator 3. Thus, the effect of chopper 4 is to grind, while stirring with agitator 3 continues. The PTFE granules with an average granule size of 100–1000 $\mu$m are raised along cylinder-shape wall 5 by the air flow coming from slit 7 between the circumferential edge of the agitator and cylinder-shape wall 5. After having hit top part 6 of shell 1, the powder particles are sent back to the center part along the direction shown in arrow B. Thus, the stirring and grinding process can be repeated to gradually achieve the desired granulation with the desired size and shape of the particles.

The shell 1 may also be equipped with a jacket, so that the granulation can be carried out by heating the PTFE powder blocks or PTFE powder particles.

The granulation time is usually 2–10 min for the first part of spraying the binder during stirring and mixing, and 2–10 min for the second part of stirring and grinding after the binder spraying is stopped.

EXAMPLES

In the following, this invention is explained in more detail with practical examples and comparative examples. The following ingredients were used.

a) PTFE powder:
  (1) TFE homopolymer
    (Teflon® 7-J, Mitsui DuPont Fluorochemical Co., Ltd.)
  (2) Modified PTFE
    (Teflon® 70-J: Mitsui DuPont Fluorochemical Co., Ltd.)
  (3) Mixture of PTFE and filler (23 wt % coke and 2 wt % graphite)
    (Teflon® 1691-J: Mitsui DuPont Fluorochemical Co., Ltd.)
  (4) Mixture of PTFE and filler (25 wt % glass)
    (Teflon® 1605-J: Mitsui DuPont Fluorochemical Co., Ltd.)
b) Binder:
  Component (1): PTFE colloidal particles with an average particle size of 0.22 $\mu$m (220 nm) or lower (as aqueous dispersion).
  Component (2): Fluorocarbon anionic surfactant (as aqueous solution) $C_9F_{17}$—O—Ph—O—$SO_3Na$.
  Component (3): Hydrocarbon anionic surfactant (as aqueous solution) $C_8H_{17}$—Ph—O—$(CH_2CH_2O)_n$—$CH_2CH_2SO_3Na$ (n=1, 2).
  Component (4): Hydrocarbon anionic surfactant (as aqueous solution) $C_8H_{17}OOCCH_2C_8H_{17}OOCCHSO_3Na$.
  Component (5): Methanol.
  Component (6): Water, including water introduced with Components (1)–(4).

Practical Examples 1–6 and Comparative Examples A–C

PTFE powder as listed in Table 1, 1500 g, was introduced into a highspeed mixer (FS-G, Fukae Kogyo Co., Ltd.), and binder as described in Table 1 was sprayed on the PTFE powder under mixing and stirring with a horizontal plate (agitator 3 of FIG. 1) rotated at 300 rpm for 2 min. Then, the granulation was conducted by stirring and grinding with both a horizontal plate rotated at 300 rpm for 5 min and a vertical stirrer (chopper 4 of FIG. 1) rotated at 3000 rpm for 2 min and at 1500 rpm for 3 min. The amounts of the binders as well as the amounts of components (1)–(6) shown in Table 1 are in weight units (weight parts) with respect to 100 weight units of the PTFE powder.

The surface tension of the binder used, also given in Table 1, was measured with a Dunouy tensiometer.

For the granulated PTFE powder thus obtained, average particle size, apparent density, angle of repose, elongation, tensile strength, and tensile elasticity were measured with the following methods, and the results are shown in Table 1.

Average particle size

The average granule size of the granulated PTFE powder was measured with a particle size measuring device (RPS-85, Seicin Co.).

Apparent density and angle of repose

The apparent density and angle of repose of the granulated PTFE powder were measured according to the methods listed in ASTM D-1457. For granulated PTFE powder made by the process of this invention, apparent density is at least 550 g/L, preferably at least 600 g/L. Preferably, the angle of repose is no more than 36°.

Elongation, tensile strength, and tensile elasticity

The granulated PTFE powder was first press-molded under a pressure of 600 kg/cm$^2$ and then this premolded product was sintered at 380° C. for 3 hr to give a flat sheet with a thickness of 2 mm. Elongation, tensile strength, and tensile elasticity were measured according to the methods of ASTM D-638 using the test sheet thus obtained.

As shown in Table 1, when the surface tension of the binder used is higher than 25 dyne/cm (Comparative Example A), the angle of repose was relatively large, showing a poor fluidity of the granulated PTFE powder. Moreover, when no solid binder was added (Comparative Example B), the angle of repose was relatively large, showing a poor fluidity of the granulated PTFE powder. The apparent density was also small, as compared to the granulated PTFE powder obtained in Practical Examples 3, 4, and 5. When using methanol as the binder for the granulation (Comparative Example C), the granulated PTFE powder was very fragile, resulting in a poor fluidity as well as a small bulk density.

TABLE 1

Granulation Ingredients and Granule Properties

| | Practical Example | | | | | | Comparative Example | | |
|---|---|---|---|---|---|---|---|---|---|
| | 1 | 2 | 3 | 4 | 5 | 6 | A | B | C |
| PTFE powder (wt parts): | | | | | | | | | |
| PTFE powder (1) | 100 | 0 | 0 | 0 | 0 | 0 | 100 | 0 | 0 |
| Modified PTFE (2) | 0 | 100 | 0 | 0 | 0 | 0 | 0 | 0 | 0 |
| Mixture (3) | 0 | 0 | 100 | 100 | 100 | 0 | 0 | 100 | 100 |
| Mixture (4) | 0 | 0 | 0 | 0 | 0 | 100 | 0 | 0 | 0 |
| Binder: | | | | | | | | | |
| Amount (wt parts) | 50 | 60 | 60 | 60 | 80 | 60 | 60 | 60 | 40 |
| Component (1) | 7.7 | 12.0 | 8.0 | 16.4 | 22.0 | 4.8 | 17.6 | 0 | 0 |
| Component (2) | 0.171 | 0.240 | 0.184 | 0.361 | 0.132 | 0.105 | 0 | 1.2 | 0 |
| Component (3) | 0.169 | 0.260 | 0.176 | 0.368 | 0.484 | 0 | 1.173 | 0 | 0 |
| Component (4) | 0 | 0 | 0 | 0 | 0 | 0.093 | 0 | 0 | 0 |
| Component (5) | 0 | 0 | 0 | 0 | 0 | 0 | 0 | 0 | 40.0 |
| Component (6) | 41.95 | 47.50 | 51.64 | 42.87 | 57.38 | 55.00 | 41.23 | 58.80 | 0 |
| Surface tension (dyne/cm) | 17.0 | 18.0 | 17.6 | 18.7 | 18.0 | 18.8 | 33.0 | 18.2 | 23.0 |
| Granulated powder: | | | | | | | | | |
| Ave. granule size ($\mu$m) | 276 | 324 | 234 | 255 | 483 | 400 | 263 | 620 | 185 |

TABLE 1-continued

Granulation Ingredients and Granule Properties

| | Practical Example | | | | | | Comparative Example | | |
|---|---|---|---|---|---|---|---|---|---|
| | 1 | 2 | 3 | 4 | 5 | 6 | A | B | C |
| Apparent density (g/L) | 777 | 758 | 663 | 715 | 758 | 808 | 632 | 517 | 474 |
| Angle of repose (°) | 35 | 34 | 33 | 34 | 34 | 31 | 40 | 37 | 41 |
| Elongation (%) | 298 | 395 | 86 | 73 | 70 | 225 | 335 | 102 | 95 |
| Tensile strength (kg/cm$^2$) | 251 | 260 | 145 | 151 | 155 | 157 | 274 | 121 | 152 |
| Tensile elasticity (kg/cm$^2$) | 4130 | 4432 | 6057 | 6682 | 6891 | 3557 | 4124 | 4903 | 5901 |

What is claimed is:

1. A method for the granulation of polytetrafluoroethylene powder, comprising spraying a binder solution on said powder while said powder is stirred and mixed, said binder solution being an aqueous surfactant solution having a surface tension of 25 dyne/cm or lower at 20° C. and containing polytetrafluoroethylene colloidal particles, said spraying being followed by stirring and grinding, thereby obtaining granulated polytetrafluoroethylene powder.

2. The method of claim 1, wherein the content of said polytetrafluoroethylene colloidal particles in said binder solution is in the range of 5–50 wt %.

3. The method of claim 1 or claim 2, wherein said surfactant has a perfluoroalkyl group or perfluoroalkenyl group as the hydrophobic group.

* * * * *

UNITED STATES PATENT AND TRADEMARK OFFICE
CERTIFICATE OF CORRECTION

PATENT NO. : 5,833,149
DATED : November 10, 1998
INVENTOR(S) : Yoshihiro, Hori

It is certified that error appears in the above-identified patent and that said Letters Patent is hereby corrected as shown below:

Title page, item [30] under Foreign Application Priority Data insert --
March 5, 1996   Japan   8-073090--

Signed and Sealed this

Fourth Day of April, 2000

Attest:

Q. TODD DICKINSON

Attesting Officer        Director of Patents and Trademarks